United States Patent [19]

Dobosz

[11] Patent Number: 4,773,974

[45] Date of Patent: Sep. 27, 1988

[54] PRODUCTION OF HEXAVALENT CHROMIUM FOR USE IN CHLORATE CELLS

[75] Inventor: Leszek M. Dobosz, Toronto, Canada

[73] Assignee: Tenneco Canada Inc., Islington, Canada

[21] Appl. No.: 924,572

[22] Filed: Oct. 29, 1986

[51] Int. Cl.$^4$ .............................................. C25B 1/26
[52] U.S. Cl. ...................................... 204/95; 423/597
[58] Field of Search .......................... 204/95; 423/597

[56] References Cited

U.S. PATENT DOCUMENTS 4,376,099  3/1983  Yamamoto et al. .................. 204/95

FOREIGN PATENT DOCUMENTS 497241  4/1976  U.S.S.R. .............................. 423/597

Primary Examiner—T. Tung
Attorney, Agent, or Firm—Sim & McBurney

[57] ABSTRACT

By-product hypochlorite from the electrolytic production of chlorates, notably sodium chlorate, is used to form hexavalent chromium for use in the electrolysis process by oxidation of trivalent chromium compounds by the hypochlorite. The hypochlorite may be the condensate produced by treatment of the chlorate cell by-product gas stream and/or present in the cell liquor.

15 Claims, 1 Drawing Sheet

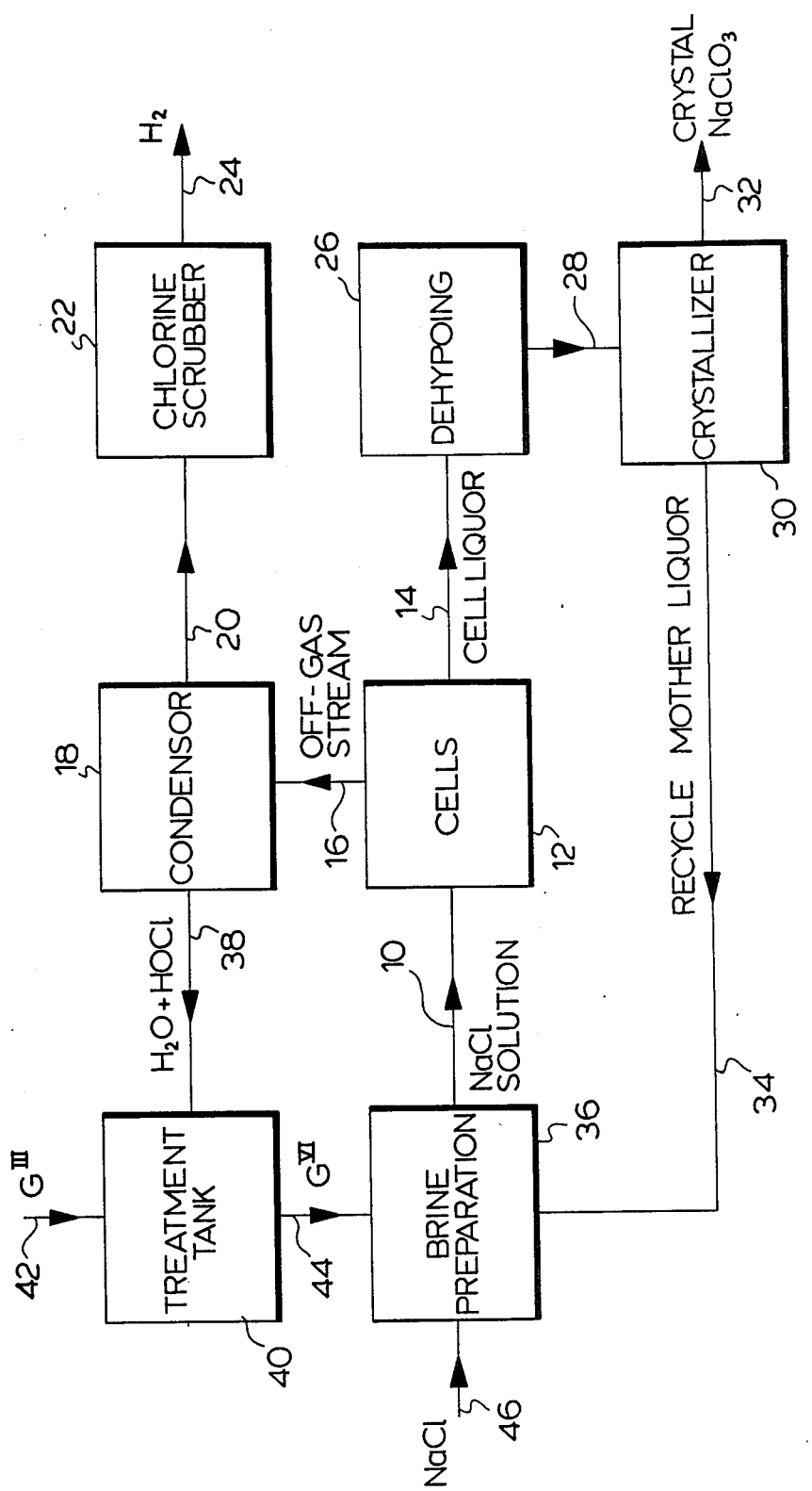

PRODUCTION OF HEXAVALENT CHROMIUM FOR USE IN CHLORATE CELLS

FIELD OF INVENTION

The present invention relates to the formation of hexavalent chromium for use in the electrolytic production of aqueous chlorate solutions.

BACKGROUND TO THE INVENTION

An aqueous solution of sodium chlorate and sodium chloride is conventionally produced by the electrolysis of aqueous sodium chloride in diaphragmless electrolytic cells. The extent of electrolysis is controlled to produce an effluent from the cell in which the sodium chlorate and sodium chloride have the desired ratio, usually in the range of about 1:1 to about 20:1 and preferably in the range of about 2:1 to about 15:1. The aqueous solution may be further processed to crystallize out the sodium chlorate for a variety of purposes, for example, in the production of chlorine dioxide for use in the bleaching of chemical cellulosic pulps, by reduction in the presence of a strong mineral acid, usually sulphuric acid, or the aqueous solution may be used as such, for example, in the production of chlorine dioxide.

In the electrolysis of sodium chloride to form sodium chlorate, hexavalent chromium conventionally is added to the brine feed to the cell to improve significantly the current efficiency of the cell in the conversion of sodium chloride to sodium chlorate, by suppressing the reduction of hypochlorite at the cathode. Usually, sodium dichromate is employed to provide the hexavalent chromium.

The aqueous sodium chloride electrolysis produces a gaseous by-product, mainly hydrogen but also some oxygen, chlorine and steam, especially when metal anodes are employed and the electrolysis occurs at elevated temperature. The by-product gas stream is passed through a condenser, wherein the steam is condensed to form an aqueous solution of hypochlorous acid, typically about 2 to 15 gpl HOCl, which also contains small amounts of dissolved chlorine. The highly corrosive nature of the condensate restricts the methods of dealing with it. For example, use in the formation of make-up liquor for chlorate production introduces severe corrosion problems. In addition, if the condensate were to be reintroduced directly to the cells, water imbalances could result, which are undesirable.

Hypochlorite also usually is present in the sodium chlorate product stream from the cells as a result of inefficient chlorate formation and is removed by so-called "dehypoing", either prior to crystallization of the sodium chlorate where the sodium chlorate is desired in that form, or prior to discharge of an aqueous solution of sodium chlorate and sodium chloride where the sodium chlorate is desired in that form. Such dehypoing is conventionally effected by heating the sodium chlorate solution at an elevated temperature for a time sufficient to remove most of the hypochlorite by conversion to chlorate and then by treatment with a reducing chemical to remove the remainder.

SUMMARY OF INVENTION

In accordance with the present invention, hexavalent chromium for the electrolysis of chlorides to form chlorates is formed by reaction between a trivalent chromium compound and hypochlorite present in an effluent from the chloride electrolysis. In this way, at least part of the hypochlorite removal and disposal problems which beset the electrolysis process are overcome as the hypochlorite ions are converted to harmless chloride ions while providing the needed hexavalent chromium from readily-available trivalent chromium compounds.

The process of the invention can be used to effect treatment of the hypochlorous acid-containing condensate, to effect treatment of aqueous chlorate solution to achieve dehypoing, or a combination, depending on the hexavalent chromium ion requirement and the amount of oxidizing agent available for oxidation. When the condensate is treated with trivalent chromium in accordance with the present invention, the resulting deactivated condensate, containing only chloride ions and chromate ions, then can be used in brine preparation for the cell.

GENERAL DESCRIPTION OF INVENTION

Any convenient source of trivalent chromium such as chromic chloride, chromic oxide or chromic hydroxide, may be employed in hypochlorite removal in accordance with the invention. These materials are readily available commercially, or may be provided from other sources. In one embodiment of the invention, the trivalent chromium which is used herein is trivalent chromium formed as a result of the treatment of aqueous chlorate solution to remove hexavalent chromium therefrom, as is conventionally effected when the sodium chlorate is supplied to a customer in that form.

In one preferred aspect of the latter embodiment, the process of the present invention is effected using chromic hydroxide formed in the manner described in co-pending U.S. patent application Ser. No. 866,726 filed May 27, 1986 (E. 185), assigned to the assignee hereof, the disclosure of which is incorporated herein by reference. In that application, there is described a process wherein hexavalent chromium values are removed from sodium chlorate solution in the form of chromic hydroxide ($Cr(OH)_3$) precipitate, by reaction of the hexavalent chromium values with dithionite in the presence of critical amounts of hydroxyl ions.

The hexavalent chromium-forming reaction effected in this invention is best achieved in basic solution, although an acidic solution may be employed. For the removal of hypochlorite from off-gas condensate by the process of the invention, therefore, it is preferred to add at least sufficient sodium hydroxide or other convenient alkalinating agent to the the condensate prior to contact with the trivalent chromium.

The present invention is particularly directed to the formation of hexavalent chromium for use in the electrolytic production of aqueous sodium chlorate from aqueous sodium chloride. However, the present invention may also be used for the formation of hexavalent chromium for use in the electrolytic production of any aqueous chlorate solution by the electrolysis of the corresponding chloride and in which the hexavalent chromium is useful. Such aqueous chlorate solutions include aqueous solutions of alkali metal chlorates, such as sodium chlorate, potassium chlorate, lithium chlorate, rubidium chlorate and cesium chlorate, alkaline earth metal chlorates, such as beryllium chlorate, magnesium chlorate, calcium chlorate, strontium chlorate, barium chlorate and radium chlorate, and mixtures of two or more such chlorates, which may also contain dissolved quantities of alkali metal chlorides, alkaline earth metal chlorides and mixtures thereof.

Electrolytically-produced sodium chlorate solution usually contains dissolved quantities of sodium chloride and this solution is generally termed "cell liquor". The concentration of sodium chlorate and of sodium chloride in cell liquor may vary widely, depending on the extent of electrolysis of the sodium chloride solution. Generally, the concentration of sodium chlorate may vary from about 100 to about 750 gpl, preferably about 250 to about 675 gpl, and the concentration of sodium chloride may vary from about 20 to about 400 gpl, preferably about 50 to about 300 gpl. Typically, cell liquor contains about 600 gpl of sodium chlorate and about 100 gpl of sodium chloride.

The concentration of hexavalent chromium which is required in the electrolysis process depends on the particular product being formed. For the production of cell liquor, hexavalent chromium usually is added to the electrolyte in an amount sufficient to provide a hexavalent chromium concentration in the range of about 0.1 to about 20.0 grams of dichromate ions per liter of solution, preferably about 0.2 to about 10.0 gpl, typically about 2 gpl.

Although the hexavalent chromium is usually added to the aqueous chloride electrolyte solution in the form of sodium dichromate ($Na_2Cr_2O_7$), other forms of water-soluble hexavalent chromium may be employed, for example, sodium chromate ($Na_2CrO_4$), chromic acid ($CrO_3$), potassium dichromate ($K_2Cr_2O_7$), potassium chromate ($K_2CrO_4$) and mixtures of two or more of such materials may be employed.

Where the hexavalent chromium is present in the chlorate solution other than as dichromate ions, for example, as $CrO_4^=$, the mole ratio of $OH^-:Cr_2O_7^=$ upon addition of hydroxide ions is determined on a chromium equivalent basis.

BRIEF DESCRIPTION OF DRAWING

The sole FIGURE of the drawing is a schematic flow sheet of a sodium chlorate plant modified in accordance with one embodiment of this invention.

DESCRIPTION OF PREFERRED EMBODIMENT

Referring to the drawing, sodium chloride solution is fed by line 10 to chlorate cells 12 wherein the sodium chloride solution is electrolyzed in cells connected in series or in parallel to form an aqueous sodium chlorate solution, also containing unreacted sodium chloride, which is removed from the chlorate cells 12 as a product stream by line 14. The electrolytic cells 12 effect diaphragmless electrolysis of the sodium chloride between electrodes. The anodes are preferably metal anodes, so that the electrolysis can be run at elevated temperatures, which increases the reaction rate and the concentration of sodium chlorate which can be present in the cell liquor.

Such metal anodes, also termed "dimensionally stable anodes", are well know in the electrolytic art, and comprise a substrate, formed of titanium, zirconium, tantalum or hafnium, with an electroconductive coating of a precious metal, for example, platinum; a precious metal alloy, for example, a platinum-iridium alloy; a metal oxide, for example, ruthenium oxide or titanium oxide; mixtures of two or more of such materials; or a platinate, for example, lithium platinate or calcium platinate. The cells may be operated generally at a temperature of about 40° to about 120° C., preferably about 70° C. to about 90° C. when using such metal anodes.

The electrolysis process produces hydrogen as a by-product. The elevated temperature of operation of the cell also produces steam and some chlorine gas is also present as a by-product of the electrolysis. The resulting off-gas stream is forwarded by line 16 to a condenser 18, wherein the off-gas stream is cooled, generally to a temperature of about 10° to about 70° C., preferably about 30° to about 60° C., to condense the steam. As a result of dissolution of the gaseous chlorine present in the off-gas stream in the condensed steam, the resulting condensate contains hypochlorous acid and dissolved chlorine. Generally, the concentration of hypochlorous acid is about 2 to about 15 gpl HOCl, particularly about 6 to about 8 gpl HOCl, and the concentration of dissolved chlorine is about 0.01 to about 5 gpl $Cl_2$, particularly about 0.1 to about 1 gpl $Cl_2$.

The gas stream resulting from the condenser 18 is passed by line 20 to a chlorine scrubber 22 wherein residual quantities of contaminating gases, usually chlorine, are removed by scrubbing in one or more operations, typically with alkali or brine, in a scrubber 22, leaving a purified hydrogen stream for discharge by line 24. Any oxygen present in the off-gas stream 16 is discharged with the hydrogen stream 24.

The cell liquor in line 14 contains dissolved hypochlorite as a result of incomplete formation of chlorate from electrolysis products and usually this hypochlorite is removed in a dehypo tank 26. The concentration of hypochlorite present in the cell liquor in line 14 generally is about 1 to about 5 gpl and preferably about 1.5 to about 3.5 gpl.

The dehypoed cell liquor is forwarded in the illustrated embodiment by line 28 to a crystallizer 30, wherein sodium chlorate is crystallized from the cell liquor and solid sodium chlorate is recovered as the product by line 32. Mother liquor from the crystallization of the sodium chlorate is recycled by line 34 to a brine preparation system 36, wherein the sodium chloride solution feed in line 10 is prepared.

The condensate from the condenser 18, as noted previously, has a relatively high concentration of hypochlorous acid and is highly corrosive. This condensate represents a difficult disposal problem in a conventional sodium chlorate plant which utilizes metal electrodes and an elevated temperature cell operation.

In accordance with the present invention, the condensate is passed by line 38 to a treatment tank 40, wherein the condensate is contacted with a trivalent chromium compound, for example, chromic hydroxide or chromic chloride, fed by line 42 to the treatment tank 40. The trivalent chromium compound is oxidized by the hypochlorite ions and the chlorine to useful hexavalent chromium compound while the hypochlorite ions and chlorine are reduced to harmless chloride.

The process may be effected over a wide range of pH but is most effective at pH values of about 6 to about 14, preferably about 8 to about 10. These pH conditions facilitate dissolution of the chromium (III) and oxidative conversion to chromium (VI). Accordingly, it is preferred to add sodium hydroxide or other suitable alkali to the condensate prior to reaction with the trivalent chromium compound.

Under alkaline pH conditions, chromium (III) dissolves as chromite ($CrO_4^{2-}$ and $CrO_3^{3-}$) and the reactions which occur in the presence of the hypochlorite can be depicted as follows:

$$CrO_2^- + 2H_2O \rightarrow CrO_4^{2-} + 4H^+ + 3e^-$$

$$CrO_3^{3-} + H_2O \rightarrow CrO_4^{2-} + 2H^+ + 3e^-$$

$$3OCl^- + 6H^+ + 3Cl^- + 3H_2O - 6e^-$$

The overall reaction may be represented as follows:

$$2CrO_2^- + H_2O + 3OCl^- \rightarrow 2CrO_4^{2-} + 3Cl^- + 2H^+$$

Under acidic conditions, the corresponding overall reaction may be represented as follows:

$$2Cr^{3+} + 5H_2O + 3OCl^- \rightarrow 2CrO_4^{2-} + 3Cl^- + 10H^+$$

Accordingly, two moles of $Cr^{III}$ reduce three moles of $OCl^-$ to produce two moles of $Cr^{VI}$. The hydrogen ions which are formed are neutralized when the process is carried out under alkaline conditions by the alkalinity of the reaction medium.

Although the above equations depict the hexavalent chromium as being formed as chromate, usually the chromate undergoes further reaction to form dichromate, as follows:

$$2CrO_4^= + 2H^+ \rightleftharpoons Cr_2O_7^= + H_2O$$

The reaction of $Cr^{III}$ with the condensate in the treatment tank 40 produces a solution containing chloride ions and hexavalent chromium and depleted with respect to the hypochlorite, which then can be forwarded by line 44 to the brine preparation tank 36. The hexavalent chromium is beneficial to the electrolysis reaction in the cells 12 and is conventionally added, as discussed earlier.

The present invention, therefore, provides a means of providing the hexavalent chromium requirements of the cell while treating the condensate stream. The extent to which the hypochlorite present in the condensate can be treated using the process of the invention depends on the extent to which the hexavalent chromium that results can be employed in the chlorate plant or elsewhere.

In the brine preparation tank 36, the feed of sodium chloride for the cells 12 in line 10 is prepared from the recycle mother liquor in line 34, the hexavalent chromium- and chloride-containing solution in line 44 and solid sodium chloride in line 46.

Trivalent chromium also may be used to effect dehypoing in the tank 26 to remove hypochlorite and again form hexavalent chromium and chloride ions. The hexavalent chromium ions so produced are recycled to the brine preparation tank 36 with the mother liquor 34.

The dehypoing of the cell liquor in the tank 26 may be effected in combination with treatment of condensate in tank 40. The extent to which both procedures can be employed is limited by the extent to which the resulting hexavalent chromium can be employed in the electrolysis process, or otherwise.

EXAMPLES

This Example illustrates the use of chromium hydroxide to treat hypochlorite solution.

Example 1

Chromic hydroxide solids were removed from cell liquor as a precipitate following the procedure described in Example 1 of U.S. Ser. No. 866,726 (case E185), as follows:

100 ml of synthetic cell liquour containing 550 gpl $NaClO_3$, 100 gpl NaCl and 3 gpl $Na_2Cr_2O_7.2H_2O$ was treated with 3 ml of 1M NaOH (mole ratio $NaOH:Na_2Cr_2O_7=3:1$) and with 0.65 g of powdered sodium dithionite (mole ratio $Na_2S_2O_4:Na_2Cr_2O_7=3:1$) at 25° C. The resulting precipitate was removed by centrifugation.

A series of experiments was conducted in which the aqueous solution containing precipitated chromic hydroxide so formed was heated to the desired temperature, the required amount of a 10% aqueous solution of sodium hydroxide was added to establish the desired pH and sodium hypochlorite solution in the form of chlorate cell off-gas condensate then was added to oxidize the precipitate to the soluble hexavalent form.

The results of the series of experiments are summarized in the following Table I:

TABLE I

| TEST | TEMP (°C.) | pH INITIAL | pH END | OXIDATION TIME (MIN) | NaOCl:Cr mole ratio (3:2) | NaOH:Cr mole ratio | % oxidated |
|---|---|---|---|---|---|---|---|
| 1 | 22 | 7.1 | 4.0 | 60 | 4:2 | 0:1 | 80 |
| 2 | 40 | 7.1 | 3.8 | 30 | 4:2 | 0:1 | 75 |
| 3 | 65 | 7.1 | 3.7 | 30 | 4:2 | 0:1 | 90 |
| 4 | 23 | 11.7 | 9.5 | 20 | 7:2 | 3:1 | 100 |
| 5 | 45 | 11.7 | 9.7 | 10 | 7:2 | 3:1 | 100 |
| 6 | 24 | 11.0 | 7.3 | 30 | 5:2 | 1:1 | 100 |
| 7 | 24 | 11.5 | 9.3 | 30 | 5:2 | 2.5:1 | 100 |
| 8 | 25 | 11.7 | 10.1 | 45 | 6:2 | 5:1 | 99 |

As may be seen from the results set forth in Table I, the process of chromic hydroxide oxidation at ambient temperature was relatively slow and higher temperatures and initial alkaline pH increased the oxidation yield and decreased the oxidation time.

Example 2

This Example illustrates the use of chromic chloride to treat hypochlorite solution.

A further series of experiments were conducted in which the chlorate cell off-gas condensate was treated with 1M NaOH solution to establish the desired pH and chromic chloride solution 0.3309M was gradually added thereto at ambient temperature. The chromic chloride was added in batches and, after each chromic chloride addition batch, the pH was readjusted with 1M NaOH solution to the initial pH and the oxidation-reduction potential (ORP) of the solution was measured. Chromic chloride addition was repeated until a significant drop in ORP had occurred, signifying removal of hypochlorite.

The results of this further series of experiments are set forth in the following Table II:

TABLE II

| TEST | HOCl (g/L) | pH | END ORP(mV) | HOCl:Cr mole ratio 3:2) | NaOH:Cr mole ratio |
|---|---|---|---|---|---|
| 1 | 6.3 | 7.2 | 915 | 2.4:2 | 8.6:1 |
| 2 | 9.9 | 7.5 | 845 | 2.5:2 | 6.2:1 |
| 3 | 13.8 | 7.5 | 850 | 3.5:2 | 7.4:1 |
| 4 | 2.2 | 9.0 | — | 5:2 | — |

As may be seen from the results of Table II, the reaction of the chromic chloride with hypochlorite was almost stoichiometric.

SUMMARY OF DISCLOSURE

In summary of this disclosure, the present invention provides a novel manner of providing hexavalent chromium for use in the electrolytic production of chlorates which uses by-product hypochlorite from the chlorate production to oxidize trivalent chromium to hexavalent chromium. Modifications are possible within the scope of this invention.

What I claim is:

1. A process for the electrolytic production of a chlorate, which comprises:
   electrolyzing in a diaphragmless cell an aqueous solution of the corresponding chloride to an aqueous chlorate product stream in the presence of hexavalent chromium ions wherein at least one effluent from the electrolysis contains hypochlorite, and
   reacting hypochlorite in said at least one effluent with trivalent chromium ions in a basic solution to form hexavalent chromium ions for use in said electrolyzing step.

2. The process of claim 1, wherein said trivalent chromium ions are provided by a chromic compound selected from the group consisting of chromic chloride, chromic oxide and chromic hydroxide.

3. The process of claim 1 wherein said at least one effluent from said electrolysis comprises the aqueous chlorate product stream.

4. The process of claim 3 wherein said aqueous chlorate product stream contains about 1 to about 5 gpl of hypochlorite.

5. The process of claim 4 wherein said aqueous chlorate product stream contains about 1.5 to about 3.5 gpl of hypochlorite.

6. The process of claim 1 wherein said trivalent chromium ions are formed as a result of the treatment of an aqueous chlorate solution to remove hexavalent chromium therefrom.

7. A process for the electrolytic production of sodium chlorate, which comprises:
   electroylzing in a diaphragmless cell an aqueous solution of sodium chloride using an electroconductive metal anode at an elevated temperature in the presence of hexavalent chromium ions to form an aqueous sodium chlorate product solution and a hydrogen off-gas stream also containing steam and chlorine gas,
   treating said hydrogen off-gas stream to provide an effluent hydrogen stram substantially free from contaminants and an aqueous condensate containing condensed steam, hypochlorite and dissolved chlorine, and
   reacting hypochlorite in said condensate with trivalent chromium ions in a basic solution to form hexavalent chromium ions for use in said electrolysis.

8. The process of claim 7 wherein said electrolysis is effected at a temperature of about 60° to about 120° C.

9. The process of claim 8 wherein said electrolysis is effected at a temperature of about 70° to about 90° C.

10. The process of claim 8 wherein said treatment of said hydrogen off-gas stream includes condensing said steam by cooling said off-gas stream to a temperature of about 30° to about 60° C., thereby to form a condensate containing about 6 to about 8 gpl HOCl.

11. The process of claim 10 wherein said trivalent chromium ions are provided by chromic hydroxide formed by reduction of hexavalent chromium ions in said product solution to trivalent chromium ions and precipitation of the trivalent chromium ions as chromic hydoxide.

12. The process of claim 10 wherein said reaction between hypochlorite in said condensate and trivalent chromium ions is effected at a pH of about 8 to about 10.

13. The process of claim 7 wherein said treatment of said hydrogen off-gas stream includes condensing said steam by cooling said off-gas stream to a temperature of about 10° to about 70° C., thereby to form a condensate containing about 2 to about 15 gpl HOCl.

14. The process of claim 13 wherein said trivalent chromium ions are provided by a chromic compound selected from the group consisting of chromic chloride, chromic oxide and chromic hydroxide.

15. The process of claim 7 wherein hexavalent chromium ions for use in said electrolysis also are formed by reaction between hypochlorite in said aqueous sodium chlorate product solution and trivalent chromium ions.

* * * * *